Feb. 13, 1940.   T. V. MOORE   2,189,919
METHOD AND APPARATUS FOR FORMATION PRESSURE TESTING
Filed July 18, 1936   4 Sheets-Sheet 1

Thomas V. Moore Inventor
By W. F. Weigester Attorney

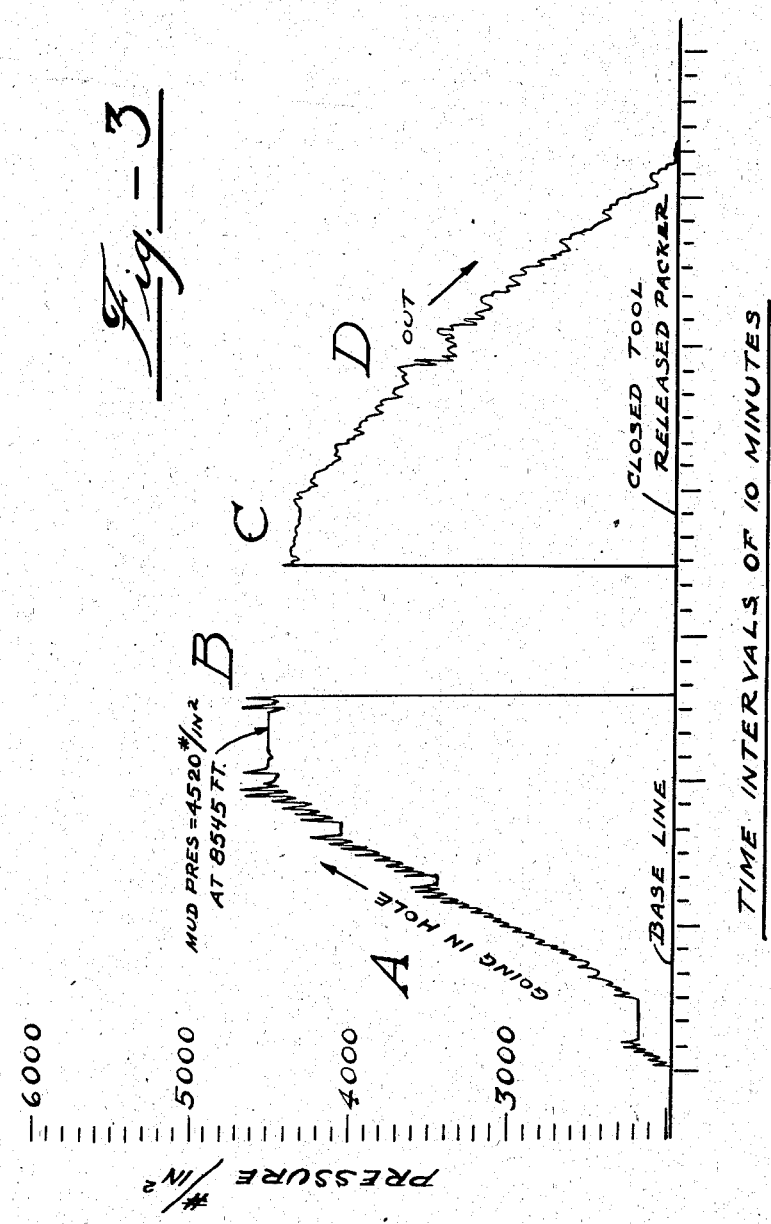

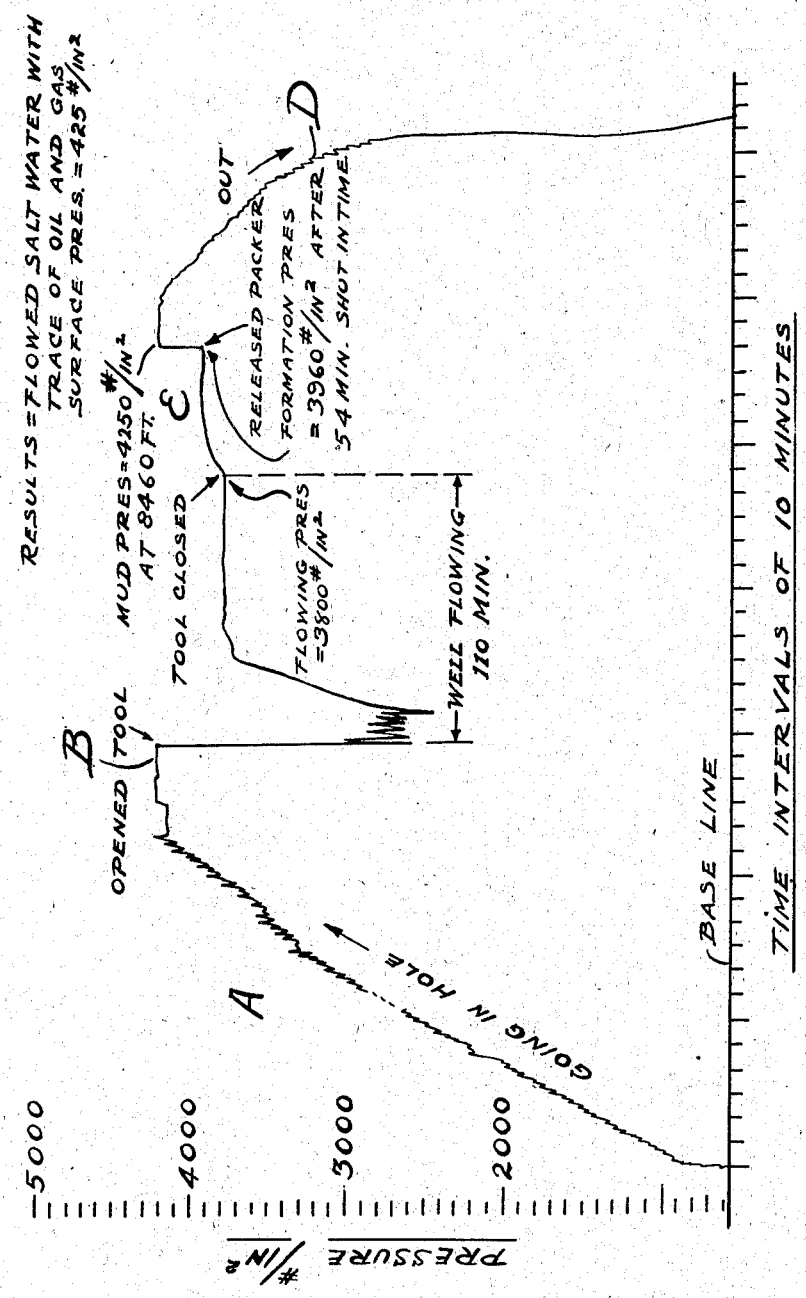

Patented Feb. 13, 1940

2,189,919

UNITED STATES PATENT OFFICE 2,189,919

METHOD AND APPARATUS FOR FORMATION PRESSURE TESTING

Thomas V. Moore, Houston, Tex., assignor to Standard Oil Development Company, a corporation of Delaware Application July 18, 1936, Serial No. 91,254

23 Claims. (Cl. 166—1)

This invention relates to an improved method and apparatus for indicating pressure of a formation tapped by a drill hole.

The invention will be fully understood from the following description taken in connection with the accompanying drawings, in which latter—

Fig. 3 is a diagram showing a record obtained by the device when the formation tested does not contain fluid under pressure greater than atmospheric, and Fig. 4 is a diagram showing a record obtained by the device when the formation tested does contain fluid under greater than atmospheric pressure.

Figure 1:
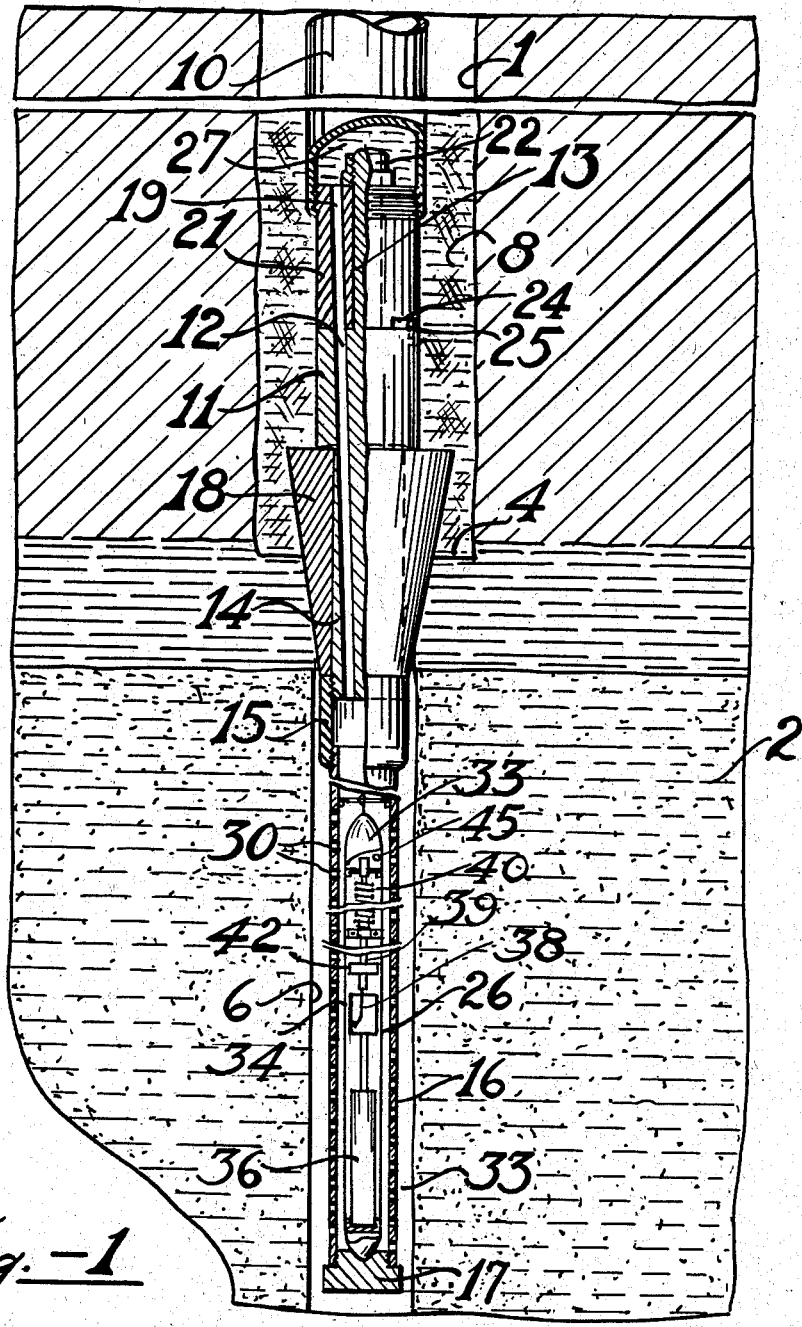
Fig. 1 is a vertical sectional view through the earth surrounding a bore hole showing, in longitudinal section, a preferred form of apparatus for carrying on the invention.

Referring particularly to the drawings, reference numeral 1 designates a bore hole or well, and 2 designates a formation, such as a sand, to be tested. The bore hole 1 is drilled to the point 4, and a hole of relatively small diameter, or rat hole, 6 is extended into the formation 2. The hole 1, normally contains drilling mud or other fluids during the drilling operation or flowing into the well from formations traversed by the hole. The drilling mud is designated as 8.

In testing the formation 2 to determine the pressure of the fluids contained therein, a formation tester is lowered into the well. The formation tester may be such as that disclosed in the U. S. patent to Simmons, No. 1,930,987, dated October 17, 1933, entitled "Method and apparatus for testing the productivity of formations encountered in a well."

Referring to Fig. 1, the formation tester is affixed to the lower end of a drill pipe 10. The formation tester includes a valve at the end of the casing 10 which can be manipulated as desired from the surface of the well to close or open the empty chamber or conduit constituted by the pipe or casing 10. The valve comprises a body 11 traversed longitudinally by one or more passages 12, disposed diametrically of the body 11. The body 11 is provided with pins 13 and 14 extending respectively upwardly and downwardly therefrom. The upper pin 13 is smaller in diameter than the lower pin 14. The lower pin 14 is traversed by passages which are continuations of the passages 12 in the body part 11. These passages converge downwardly and they both communicate at their base with the interior of the hollow adjusting sleeve 15. The adjusting sleeve 15 is connected to a hollow perforated pipe or strainer 16, which when the invention is employed to test a well through the employment of a so-called "rat hole" is adapted to fit into the rat hole and support the sides of the rat hole when the pressure of the mud-laden fluid within the well is sealed off from said hole as hereafter described. The strainer 16 is closed at its lower end by the plug 17. The pin 14 is made of greater diameter also in order to better receive a packer member 18. The packer member 18 is indicated as being of frusto-conical shape so that it is adapted to wedge within the upper end of the rat hole within the well bore, and thus seal the formation below the pressure of the mud-laden fluid within the well. For this purpose the packer member 18 may, for example, be composed of rubber, lead or other appropriate material.

The upper divergent ends of the passages 12 open at opposite sides of the narrow upper pin 13 and these passages are adapted to register with similar passages 19 extending lengthwise through the head or bushing 21 of the valve, which head is rotatably mounted upon the pin 13 and is secured thereto by the lock nuts 22 screwed upon the upper end of the pin 13. The bushing 21 is preferably cylindrical in form and has screw-threaded connection with the pipe 10. The passages 19 open out upon the upper end of the bushing 21 and communicate with the interior of the pipe or casing 10.

The lower end of the bushing 21 is provided with a slot 24 to receive a pin 25 which projects upwardly from the upper end of the body portion 11.

It will be seen that there is provided a valve at the end of the casing 10 which can be manipulated as desired from the surface of the well to close or open the empty chamber or conduit provided by the pipe or casing 10. The slot 24 and the pin 25 between the bushing 21 and the body 11 of the valve provide a means by which the relative rotation between the head and body of the valve may be limited in order to facilitate registering the passages in the head with those in the body of the valve.

In using the apparatus for testing formations, the valve is first closed and the device is then let down through the well. In this condition any fluid that may be standing in the well will be prevented from entering the casing 10. In this manner there is thus established an empty chamber or conduit adjacent the formation 2 to be tested, without the necessity of removing the mud-laden fluid 8 from the well. The packer 18 is lowered into the small hole 6 and is forced against the shoulder 4, compressing the packer and thereby excluding all fluid from the well above. The packing member 18 is forced against the shoulder 4 sufficiently tightly to separate the column of drilling mud in the bore hole 1 above the packer 18 from the body of the drilling mud in the rat hole 6 trapped beneath the packer 18. It will be understood that the hydraulic pressure of the column of mud-laden fluid 8 in the well is very great, often in excess of 2,000 lbs./sq. in. By separating the drilling fluid and the portion of the hole below the packing member 18 from the column of drilling fluid above the packing member 18, the weight of the column of liquid above the packer 18 is removed from the liquid below the packer 18.

In view of the high pressures of the column of drilling mud exerted upon the drill pipe 10, it is frequently desirable to partially fill the drill pipe 10 with liquid, such as water or drilling fluid, designated 27, to prevent collapse of the drill pipe due to the high pressures. It will be understood that the drill pipe 10 is not completely filled with the water 27, but only to a sufficient height to prevent collapse of the pipe. When the pressures prevailing in the column of drilling mud are not sufficiently great as to cause danger of collapse of the pipe, no liquid is disposed within the pipe. The upper end of the drill pipe is opened to the atmosphere.

For testing the pressures in the hole 6 below the packer member 18, and in the formation 2 adjoining the hole, the sleeve 15 carries a depending tube 16 perforated as indicated at 30. The perforated tube 30 contains a deep well pressure gauge 33. The gauge comprises a drum 34 containing a chart, which are together driven in rotation by means of clock mechanism 36 for a prolonged period of time, such as 20 hours or the like. The pressures prevailing in the rat hole 6 and in the sand tube to be tested are indicated upon the chart through the following mechanism. A stylus 38 is suspended within the gauge 33 by means of a piston 39 carried by a helical spring 40, and bears against the chart carried by the drum 34. The piston 39 passes slidably through a partition 42 in the gauge. The portion of the gauge above the partition 42 communicates with the exterior of the gauge through an opening 45. As a result, the stylus 38 is responsive to the pressure exteriorly of the gauge to draw a mark upon the chart proportionate to the pressure outside of the gauge.

The assembled formation tester and recording gauge are lowered into the hole 1, and the sealing member 18 is forced against the shoulder 4. The closed lower end of the body portion 11 is then opened by turning the drill stem 10 which opens the valve. The drilling fluid plus the fluid in the formation 2 is under the initial pressure of the column of drilling fluid and consequently flows upwardly through the open valve into the drill pipe 10. The chart of the pressure gauge 33 was set in rotation when the formation tester was first lowered into the drill hole. The chart, therefore, initially records the increasing pressure to which the pressure gauge is subjected as it is lowered through the drilling fluid to the bottom of the hole. Upon opening the valve member 21, the trapped fluid flows into the drill pipe and the pressure of the fluid surrounding the gauge 33 drops. The changing pressures are continuously recorded. The packing member 18 is maintained against the shoulder 4 for a suitable length of time to permit the pressure of the fluid surrounding the gauge 33 to reach an equilibrium position. The valve member 21 is then rotated by the drill pipe 10 into position to close the valve, after which the combined formation tester and deep well pressure gauge are drawn upwardly through the hole 1. Upon removing the packing member 18 from the hole 6, the gauge again becomes subjected to the pressure of the column of drilling fluid so that a record is obtained of the pressures of the drilling fluid at various elevations in the well.

A record obtained where the formation did not contain fluid under pressure is illustrated in Fig. 3, in which the ordinate designates lbs. pressure/sq. in. and the abscissa designates time intervals of ten minutes. Referring to the chart, the line designated A designates the increasing pressure of the column of mud as the device was lowered into the well. The line A designates the pressure in a well to a depth of 8,545 feet. It will be noted that the pressure of the column of drilling mud adjoining the gauge increased to a pressure of 4,520 lbs./sq. in. at 8,545 feet. At the point designated B, the valve member 21 was opened and the fluid in the rat hole 6 and formation 2 flowed into the pipe 10. It will be noted that the trace of the record dropped abruptly. At the point on the chart designated C, the valve member 21 was closed and the apparatus was drawn upwardly through the well. The gauge was thus again exposed to the pressure of the column of drilling fluid which pressure gradually decreased as indicated on the trace at D.

Referring to Fig. 4, a record is illustrated taken of pressure measurements made in which the formation 2 contained fluid under greater than atmospheric pressure. Arrangement of the record is identical with that illustrated in Fig. 3. Referring to the record, the trace designated by A shows that the mud pressure increased to a pressure of 4,250 lb./sq. in. at a depth of 8,460 feet. At this depth, the valve member 21 was opened as indicated at point B on the chart. The trace dropped off abruptly to a pressure of approximately 2,700 lbs./sq. in. as the trapped fluid from the portion of the hole designated 6 flowed into the drill pipe 10. The trace shows that as the formation fluids continued their flow into the drill pipe for 110 minutes, flowing pressure increased to a substantially constant level of 3,800 lbs./sq. in. At the point C the valve member 21 was closed. The record shows that from the time of closing the valve member 21 and up to the time of removing the packing member 18 from engagement with the walls of the well, the formation pressure increased to 3,960 lbs./sq. in. after 54 minutes of shut-in time. This section of the trace is designated E. The instrument was then drawn upwardly through the well and the trace D shows the pressure reduction recorded by the gauge 33 at this time.

It will be understood that the formation 2 to be tested may be formed of porous and permeable rock and that the pores may contain fluid under pressure. The reduction of pressure as the trapped fluid flows into the drill pipe 10 may permit of expansion of vapors contained in the formation fluid, such as hydrocarbon vapors where the formation fluid is oil. Then the index of the productivity of the formation 2 is the quantity of fluid produced per unit of lowering of pressure and the effect on the formation 2. The record of pressure obtained gives an indication of the nature or productivity of the sand being tested. Also the record indicates the success or failure of the mechanical operations involved in making the tests.

While in the embodiment illustrated in Fig. 1, drill pipe 10 is shown as containing liquid 27 under lesser pressure than the pressures prevailing in the drilling mud outside of the drill pipe 10, to permit of obtaining a differential pressure between the trapped fluid and the contents of the drill pipe, it will be understood that the drill pipe may be empty of liquid so that the contents of the drill pipe will be subjected to atmospheric pressure.

Figure 2:
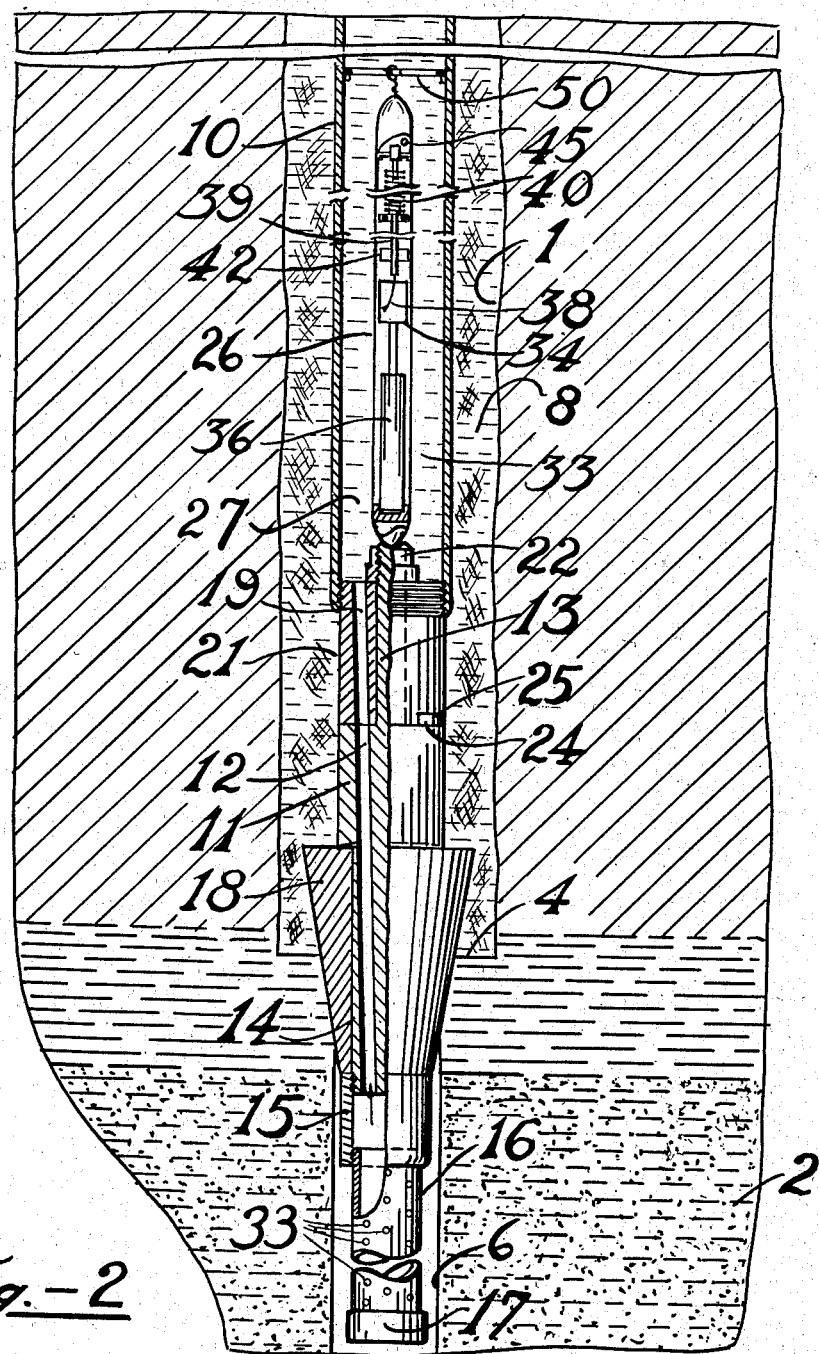
Fig. 2 is a vertical sectional view through the device showing the pressure gauge disposed in the casing above the sand tester.

In the embodiment illustrated in Fig. 2, the pressure gauge 33 is illustrated as being supported upon the walls of the drill pipe 10 by means of a suitable bracket or spider 50, at a point above the valve member 21 any suitable distance, such as from one to several hundred feet. Alternatively, the pressure gauge 33 may be located directly upon the body of the formation tester and some of the advantages of the invention will be retained. In still another modification of the invention, it is contemplated to lower the deep well pressure gauge by a line or string of pipe into the drill pipe 10, into a position immediately above the valve member 21 so that upon opening the valve member 21 the deep well pressure gauge will record the pressures of the fluid flowing into the drill pipe 10. It will be understood that, in the last mentioned cases, the pressure gauge will not record the pressure of the trapped fluid prior to the opening of the valve 21.

By inspection of the record, the operator is able to definitely know whether the valve member 21 has been opened or not. The records show the original pressure of the fluid contained in the formation 2, and they give an indication of the productivity of the formation 2, from the pressures maintained during the flow while the valve member 21 is open. Opening of the valve member 21 reduces the pressure opposite the sand or formation 2, thus permitting any fluid in the formation 2 to flow into the drill pipe 10. The pressure of any fluid contained in the formation 2 equals the reservoir pressure.

Various changes and alternate arrangements may be made within the scope of the appended claims, in which it is our intention to claim all novelty inherent in the art as broadly as the prior art permits.

I claim:

1. The method of indicating production of a formation tapped by a drill hole containing liquid, which comprises shutting off communication with the formation of the liquid in the hole at a point above the formation, opening communication of the formation to a pressure less than the formation pressure, and recording the pressures occurring in the hole adjacent the formation as flow occurs.

2. The method of indicating productivity of a formation tapped by a drill hole containing liquid, which comprises lowering into the hole a pipe having a closed lower end while maintaining the upper end of the pipe above the liquid, sealing the pipe against the walls of the hole at a point above the formation to prevent communication between the liquids around the pipe above and below the seal, opening the closed lower end to permit flow of the trapped fluid and any formation fluid into the pipe whereby the formation and its contained fluid are subjected to reduced pressure, and obtaining a continuous record of the pressures exerted by the formation or the fluids contained therein or issued therefrom.

3. The method of indicating productivity of a formation tapped by a drill hole containing liquid under greater than atmospheric pressure which comprises lowering into the hole a pipe partially filled with liquid and having a closed lower end, while maintaining the upper end of the pipe above the liquid, sealing the pipe against the walls of the hole at a point above the formation to prevent communication between the liquids around the pipe above and below the seal, opening the closed lower end to permit flow of the trapped fluid and any formation fluid into the pipe whereby the formation and its contained fluids are subjected to reduced pressure, and obtaining a continuous record of the pressures exerted by the formation or the fluids contained therein or issued therefrom.

4. Apparatus for indicating productivity of a formation tapped by a drill hole, which comprises means for shutting off communication with the formation of any liquid in the hole at a point above the formation, means for opening communication of the formation to a pressure less than the formation pressure to permit flow of fluids from the formation, and means for recording the pressures occurring in the hole adjacent the formation as flow occurs.

5. Apparatus for indicating the productivity of a formation tapped by a drill hole containing liquid, which comprises a pipe having a closed lower end adapted to be lowered into the hole with its upper end above the liquid, means for sealing the pipe against the walls of the hole at a point above the formation to prevent communication between the liquids around the pipe above and below the seal, means for opening the closed lower end to permit flow of the trapped fluid and any formation fluid into the pipe whereby the formation and its contained fluid are subjected to reduced pressure, and means for obtaining a continuous record of the pressure exerted by the formation or the fluids contained therein or issued therefrom.

6. Apparatus for indicating the productivity of a formation tapped by a drill hole containing liquid, which comprises a pipe having a closed lower end adapted to be lowered into the hole with its upper end above the liquid, means for sealing the pipe against the walls of the hole at a point above the formation to prevent communication between the liquids above and below the seal, valve means for opening the closed lower end to permit flow of the trapped fluid and any formation fluid into the pipe whereby the formation and its contained fluid are subjected to reduced pressure, and means disposed above the valve means in the pipe for obtaining a continuous record of the pressure exerted by the formation or the fluids contained therein or issued therefrom.

7. Apparatus for indicating the productivity of a formation tapped by a drill hole containing liquid, which comprises a pipe having a closed lower end adapted to be lowered into the hole with its upper end above the liquid, means for sealing the pipe against the walls of the hole at a point above the formation to prevent communication between the liquids above and below the seal, valve means for opening the closed lower end to permit flow of the trapped fluid and any formation fluid into the pipe whereby the formation and its contained fluid are subjected to reduced pressure, and means disposed below the valve means for obtaining a continuous record of the pressure exerted by the formation or the fluids contained therein or issued therefrom.

8. Apparatus for indicating productivity of a formation tapped by a drill hole containing liquids, which comprises a pipe having a closed lower end adapted to be lowered into the hole with its upper end above the liquid, means for sealing the pipe against the walls of the hole at a point above the formation to prevent communication between the liquids above and below the seal, valve means for opening the closed lower end to permit flow of the trapped fluid and any formation fluid into the pipe whereby the formation and its contained fluid are subjected to reduced pressure, and a perforated tube depending from the lower end of the pipe, and a recording device contained in the tube for obtaining a continuous record of the pressure exerted by the formation or the fluid contained therein or issued therefrom.

9. A method of testing an oil well, which comprises lowering into the well an empty string of pipe carrying a valve and a packer and a pressure recording device attached to the pipe below the packer, setting the packer in the well to seal off the formation to be tested from the fluid within the well, opening the pipe with a valve set to permit fluid from the formation to enter the pipe and the recording device to record the resulting pressure, then closing the valve and removing the pipe with the recording device to the top of the well.

10. A device for testing well pressure which comprises a packer adapted to be lowered into a well to seal off the same, said packer carrying pressure responsive means therebeneath whereby the pressure of the fluid beneath the packer may be ascertained, and means for lowering the said elements into the well and for removing the same therefrom.

11. Means for obtaining a sample of the fluid occurring in the formation of a well bore and for ascertaining the pressure of the fluid in the formation, which comprises a string of tubing adapted to be lowered into the well, a packer at the lower end thereof having a passageway therethrough to communicate with said string of tubing, valve means controlled from the top of the well to open and close the passageway through the packer when the packer is set in the hole, pressure recording means disposed beneath the packer and carried thereby and being responsive to the pressure of the fluid sealed within the hole below the packer, whereby a record of said pressure may be obtained, and means for operating the valve means whereby the fluid sealed beneath the packer may be permitted to flow upwardly therethrough and into the pipe under the pressure of the formation and to be thereafter entrapped, and whereby the pressure occurring beneath the packer after the fluid has been entrapped in the drill stem will be recorded by the recording device, after which the string of tubing, the packer and the pressure recording device will be withdrawn from the well with the sample and record.

12. A method of testing the pressure and productivity of a formation in a well containing drilling fluid involving the insertion of only a single string of pipe into the well to make a test, which includes lowering a test string into the well through the drilling fluid with a packer carried by the string and a valve inlet at the lower end of the string closed against the entrance of fluid from the well and a pressure recorder below said valve and packer, setting the packer above the formation and opening the valve to permit fluid from the formation to enter the inlet, making a record of the fluid pressure below said packer, closing the valve to prevent the subsequent entrance of fluid from the well through the inlet, making a record of the fluid pressure below said packer after said valve has been closed, and then releasing the packer and raising the pressure recorder and the test string with the inlet closed against entrance of fluid from the well to remove an entrapped sample.

13. A method of testing the pressure and productivity of a formation in a well containing drilling fluid involving the insertion of only a single string of pipe into the well to make a test, which includes lowering a test string into the well through the drilling fluid with a packer carried by the string and a valve inlet at the lower end of the string closed against the entrance of fluid from the well and a pressure recorded below said valve and packer, setting the packer above the formation and opening the valve to permit fluid from the formation to enter the inlet, closing the valve to prevent the subsequent entrance of fluid from the well through the inlet and releasing the packer and raising the pressure recorder and the test string with the inlet closed against entrance of fluid from the well to remove an entrapped sample, and including the step of making a continuous record of fluid pressure below said packer during the entire productivity testing operation.

14. A method of checking the operation of a formation tester having a pipe with a valve at the lower end thereof and a packer to isolate the formation being tested from extraneous pressure including the steps of operating said valve and recording the pressure below said valve and said packer.

15. A well testing tool, comprising a packer having a passageway therethrough, a tubular drill string connected to the packer and supporting the same, means normally excluding fluid from the drill stem and for entrapping a sample of fluid from beneath the packer within the drill string when the packer is set, pressure recording means carried by the packer and therebeneath, and being sensitive to the pressure existing within the fluid beneath the packer, whereby the pressure of the fluid of the formation beneath the packer may be recorded while the packer is set.

16. A method of testing a well and checking the functioning of a formation tester which comprises lowering into the well an empty string of pipe carrying a valve and a packer and a pressure recording device attached to the pipe below the packer, setting the packer in the well to seal off the formation to be tested from the fluid within the well, recording the pressure below said valve and said packer with said recording device whereby it is simultaneously recorded whether the valve is functioning properly and removing the pipe with the recording device to the top of the well.

17. A method of testing the formation of an oil well or the like which includes the steps of lowering into the well an apparatus adapted to seal off a portion of the well adjacent the formation being tested and take a sample of fluid therefrom, together with a pressure recording device, sealing off the formation being tested from the fluid in the well, taking a sample of fluid from the formation, recording the pressure during the taking of the sample and removing the apparatus, sample and recording device from the well.

18. An apparatus for testing oil wells or the like which includes means for sealing off a portion of the well from the remainder and a pressure indicating device associated therewith and adapted to indicate the pressure in the sealed off portion of the well.

19. In combination, a formation tester for a well bore including a packer adapted to seal off a formation from the remainder of the bore, and a pressure recorder below said packer adapted to be positioned adjacent said formation to record the pressure thereof when said packer is set.

20. A formation pressure tester for a well bore comprising a pipe string, a valve in said pipe, a pressure recorder below said valve, a packer above said recorder adapted to seal said recorder into a given formation in the said well bore, said recorder being adapted to record the pressure on said formation when said valve is opened.

21. Apparatus for testing a well comprising a string of pipe to be lowered into a well having an inlet at its lower end and carrying a packer adapted to be positively pressed against the walls of the formation to seal off the same above the inlet, a valve for said inlet adapted to be controlled from the top of said well to open and close said inlet while the packer is seated and a pressure responsive device below said packer.

22. In combination, a formation tester including a tail piece having an inlet therein and a packer adapted to seal said tail piece into a formation to be tested, a tubular casing secured to said tail piece and a pressure recorder in said casing.

23. An apparatus for testing an oil well, comprising the combination of a formation tester including a string of pipe, valve packer and inlet of a pressure recording apparatus connected to said inlet and provided with means for automatically recording the pressure of fluids in the inlet pipe of said apparatus.

THOMAS V. MOORE.